US011585938B2

(12) United States Patent
Heussner et al.

(10) Patent No.: US 11,585,938 B2
(45) Date of Patent: Feb. 21, 2023

(54) LIDAR SYSTEM AND CONTROL SYSTEM FOR A MOTOR VEHICLE

(71) Applicant: Robert Bosch GmbH, Stuttgart (DE)

(72) Inventors: Nico Heussner, Ludwigsburg (DE); Stefan Spiessberger, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1058 days.

(21) Appl. No.: 16/264,128

(22) Filed: Jan. 31, 2019

(65) Prior Publication Data
US 2019/0235084 A1 Aug. 1, 2019

(30) Foreign Application Priority Data

Feb. 1, 2018 (DE) .......................... 102018201507.4

(51) Int. Cl.
G01S 17/931 (2020.01)
G01S 7/481 (2006.01)
G01S 17/08 (2006.01)

(52) U.S. Cl.
CPC ............ G01S 17/931 (2020.01); G01S 7/481 (2013.01); G01S 17/08 (2013.01)

(58) Field of Classification Search
CPC .... H01S 5/0078; H01S 5/5045; H01S 5/4062; H01S 5/00
See application file for complete search history.

(56) References Cited

U.S. PATENT DOCUMENTS 5,241,315 A 8/1993 Spinhirne
6,462,329 B1* 10/2002 Davis ..................... G01K 11/32
250/231.19
2004/0191637 A1* 9/2004 Steckman ............ G02B 6/0218
430/1
2005/0074206 A1* 4/2005 Domash ............. G02B 6/29361
385/27
2011/0010034 A1* 1/2011 Zagorski ............... B60W 50/12
701/31.4

(Continued)

FOREIGN PATENT DOCUMENTS

DE 4424717 A1 1/1996
DE 10146006 A1 4/2003

OTHER PUBLICATIONS

Mostallino, Roberto, et al. "Thermal Management Characterization of Microassemblied High Power Distributed-Feedback Broad Area Lasers Emitting at 975nm." 2017 IEEE 67th Electronic Components and Technology Conference (ECTC). IEEE, 2017. (Year: 2017).*

(Continued)

Primary Examiner — Clifford Hilaire
(74) Attorney, Agent, or Firm — Norton Rose Fulbright US LLP; Gerard Messina

(57) ABSTRACT

A LIDAR system includes a monolithic frequency-stabilized semiconductor laser having a linear thermal wavelength shift and a bandpass filter that is configured to effectuate a thermal wavelength shift that does not deviate from the linear thermal wavelength shift of the semiconductor laser by more than 40%, and a temperature stabilization of the semiconductor laser can be dispensed with by the use of the invention. The LIDAR system can be provided in a control system that includes a control unit that controls obstacle avoidance of a motor vehicle based on an obstacle distance determined by the LIDAR system.

9 Claims, 2 Drawing Sheets

(56) References Cited

U.S. PATENT DOCUMENTS

2017/0307736 A1  10/2017  Donovan

OTHER PUBLICATIONS

Zheng Y, Kawashima T, Satoh N, Kan H. Stable-spectrum and narrow-linewidth operation of broad-area distributed feedback diode laser with volume Bragg grating. Applied Physics Express. Oct. 7, 2015;8(11):112101. (Year: 2015).*

Filion J, Olivier M, Burgoyne B, Villeneuve A, Piché M. Spectral and temporal control of an actively mode-locked fiber laser. InPhotonics North 2009 Aug. 4, 2009 (vol. 7386, p. 738636). International Society for Optics and Photonics. (Year: 2009).*

Jewell JM. Thermooptic coefficients of some standard reference material glasses. Journal of the American Ceramic Society. Jul. 1991;74(7):1689-91. (Year: 1991).*

\* cited by examiner

LIDAR SYSTEM AND CONTROL SYSTEM FOR A MOTOR VEHICLE

CROSS-REFERENCE TO RELATED APPLICATIONS

The present application claims priority under 35 U.S.C. § 119 to DE 10 2018 201 507.4, filed in the Federal Republic of Germany on Feb. 1, 2018, the content of which is hereby incorporated by reference herein in its entirety.

FIELD OF THE INVENTION

The present invention relates to a LIDAR system and a control system for a motor vehicle.

BACKGROUND

Light Detection And Ranging (LIDAR) systems are able to determine distances of objects based on reflection light transit times. LIDAR systems are used, for example, in motor vehicles for obstacle avoidance. They supply a controller with a detected obstacle distance, which the controller uses for the obstacle avoidance.

To be able to recognize that detected light was previously emitted and was accordingly reflected from an object, lasers, for example, which in principle emit light at a constant wavelength, are used together with an optical bandpass filter. The bandpass filter is used to improve the signal-to-noise ratio by filtering out background light and includes, for example, an interference filter or a filter which uses a combination of interference and absorption effects.

Solely dielectric interference filters having a low temperature-induced wavelength shift of 0.01 nm/K are typically used. The semiconductor lasers typically used as the laser source, in contrast, have a comparatively large temperature dependence of 0.3 nm/K. Even semiconductor lasers having a monolithic integrated frequency stabilization still have a thermal wavelength shift of 0.07 nm/K.

In order for a laser to be used without temperature stabilization in a LIDAR system, a bandpass filter having a correspondingly broad passband should be used, since otherwise the wavelength of the laser runs out of the passband because of the operating temperature. This limits the achievable signal quality, since the more interfering light is incident on the detector the broader the passband is.

A multilayer interference filter is known from DE 4424717 A1, which includes layers made of hydrogenous amorphous silicon, where a dλ/dt of the two mirror layers is able to be equal, so that a change of the temperature results in a shift of the central wavelength with consistency of the transmission breadth.

SUMMARY

Example embodiments of the present invention are directed to a LIDAR system and to a control system including the LIDAR system.

According to an example embodiment, a LIDAR system includes a monolithic frequency-stabilized semiconductor laser having a linear thermal wavelength shift, and a bandpass filter that includes an element that causes a thermal wavelength shift that does not deviate from the linear thermal wavelength shift of the semiconductor laser by more than 40%, preferably does not deviate by more than 20%, and still more preferably does not deviate by more than 5%.

According to an example embodiment, a control system includes the LIDAR system, where the LIDAR system is configured for a determination of an obstacle distance, and the control system further includes a control unit configured for obstacle avoidance by the motor vehicle using the determined obstacle distance.

Using the bandpass filter, which is adapted in its thermal wavelength shift to the semiconductor laser, a LIDAR system can be implemented which manages over a broad temperature range without a temperature stabilization of the semiconductor laser, and without the bandpass filter having to be more broadband for this purpose. A temperature stabilization of the semiconductor laser can thus be dispensed with by using the present invention. The complexity can thus be reduced, the costs can be decreased, and the power consumption can be reduced.

In an example embodiment, the element is entirely or partially made of a material that provides a dependence of the central wavelength on the temperature which is significantly greater, preferably at least two times greater, than that of glass. The material can include amorphous silicon.

This is a particularly simple design in order to effectuate a thermal wavelength shift of the bandpass filter which corresponds to that of the semiconductor laser.

The bandpass filter can be a cavity filter and the element can include a spacer having a thermal length expansion, which causes a wavelength shift of the bandpass filter corresponding to the linear thermal wavelength shift of the semiconductor laser. This is another simple design in order to effectuate a thermal wavelength shift which corresponds to that of the semiconductor laser.

The bandpass filter can include bandpass filter segments having different transmission properties and the element can include a shift element, the shift element being able to place one of the bandpass filter segments on an optical path in dependence on a temperature of the bandpass filter. This is still a further simple design, in order to effectuate a thermal wavelength shift of the bandpass filter corresponding to the laser.

The bandpass filter segments can have different layer thicknesses.

The different transmission properties of the bandpass filter segments can thus be easily implemented.

The bandpass filter can furthermore have a narrow optical passband. Background light can thus be filtered out efficiently.

In an example embodiment, the thermal wavelength shift of the element does not deviate by more than 0.01 nm/K from the linear thermal wavelength shift of the semiconductor laser.

Example embodiments of the present invention will be explained in greater detail on the basis of the drawings and the following description, and advantageous refinements of the present invention are described in the detailed description.

DETAILED DESCRIPTION

According to an example embodiment of the present invention bandpass filter concepts based on temperature-sensitive materials are used in combination with monolithic frequency-stabilized semiconductor lasers in a LIDAR system. Such a LIDAR system can be used over a broad temperature range without temperature stabilization of the laser source due to the adapted thermal wavelength shifts.

One example of a temperature-sensitive material is amorphous silicon. Using amorphous silicon, a bandpass filter can be manufactured which displays a thermal shift of the central wavelength of the passband of approximately 0.07 nm/K, and which is thus similar to that of a typical monolithic frequency-stabilized semiconductor laser. This enables a comparatively narrow passband, which would only be achievable using a temperature stabilization of the semiconductor laser without the thermal dependence of the central wavelength of the passband. The LIDAR system can therefore be operated over a broad temperature range using a narrow optical bandpass filter without temperature stabilization. The narrow passband overcompensates for the low efficiency of monolithic frequency-stabilized semiconductor lasers.

Figure 1:
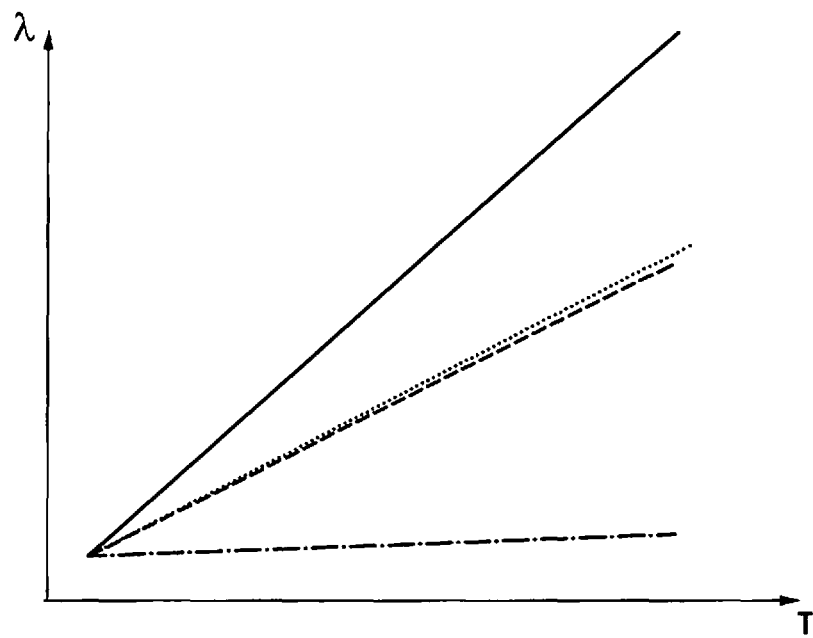
FIG. 1 shows an overview of thermal wavelength shifts of semiconductor lasers and bandpass filter types.

An overview of central wavelengths λ of semiconductor lasers and bandpass filter types in dependence on temperature T is shown in FIG. 1. The black line represents the temperature behavior of the central wavelength of a non-stabilized semiconductor laser, the dot-dash line schematically represents the temperature behavior of the central wavelength of an interference filter, the dotted line represents the central wavelength of a stabilized semiconductor laser, and the dashed line represents the temperature behavior of the central wavelength of a bandpass filter based on amorphous silicon. The temperature behavior of the bandpass filter based on amorphous silicon and of the stabilized semiconductor laser are recognizably almost identical.

By corresponding design, bandpass filters made of amorphous silicon are therefore implementable, which do not deviate from the linear thermal wavelength shift of a stabilized semiconductor laser by more than 40%. A deviation restriction to not more than 20%, not more than 10%, or not more than 5%, even to not more than 1%, is also possible. In an example embodiment, a bandpass filter is made of amorphous silicon having a thermal wavelength shift that does not deviate by more than 0.01 nm/K from the linear thermal wavelength shift of the semiconductor laser.

Figure 2:
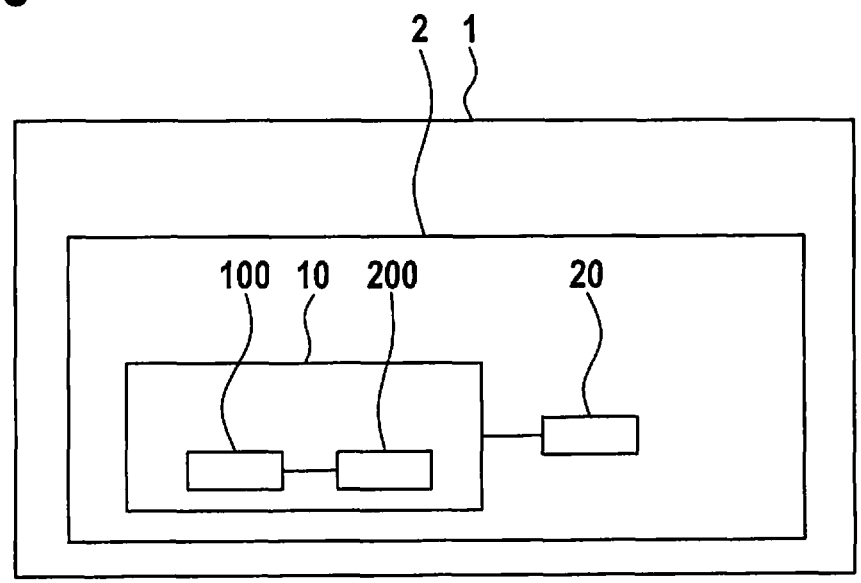
FIG. 2 shows an example use of an example embodiment of the present invention.

FIG. 2 shows an example use of a LIDAR system according to an example embodiment of the present invention in a control system 2 of a motor vehicle 1. Control system 2 includes LIDAR system 10 and a control unit 20. LIDAR system 10 is configured for a determination of an obstacle distance of an obstacle from motor vehicle 1.

Control unit 20 is designed for obstacle avoidance, i.e., it is designed to control motor vehicle 1 using the determined obstacle distance in such a way that a collision with the obstacle is avoided.

The LIDAR system includes a monolithic frequency-stabilized semiconductor laser 100 having a linear thermal wavelength shift and a bandpass filter 200. Bandpass filter 200 includes amorphous silicon, which causes a thermal wavelength shift. This thermal wavelength shift deviates at most marginally from the wavelength shift of semiconductor laser 100.

According to another aspect, the present invention provides the use of a bandpass filter concept especially adapted to the laser source. The design requirements of the bandpass filter are thus expanded by a further requirement, in addition to the spectral requirement, namely configuring the thermal shift of the transmission spectrum in such a way that it matches with that of the laser source.

In an example embodiment of the present invention, the bandpass filter includes a cavity bandpass filter and a spacer. The spacer is designed in such a way that its thermal expansion effectuates a thermal shift of the central wavelength of the cavity filter which corresponds to that of the laser.

Figure 3:
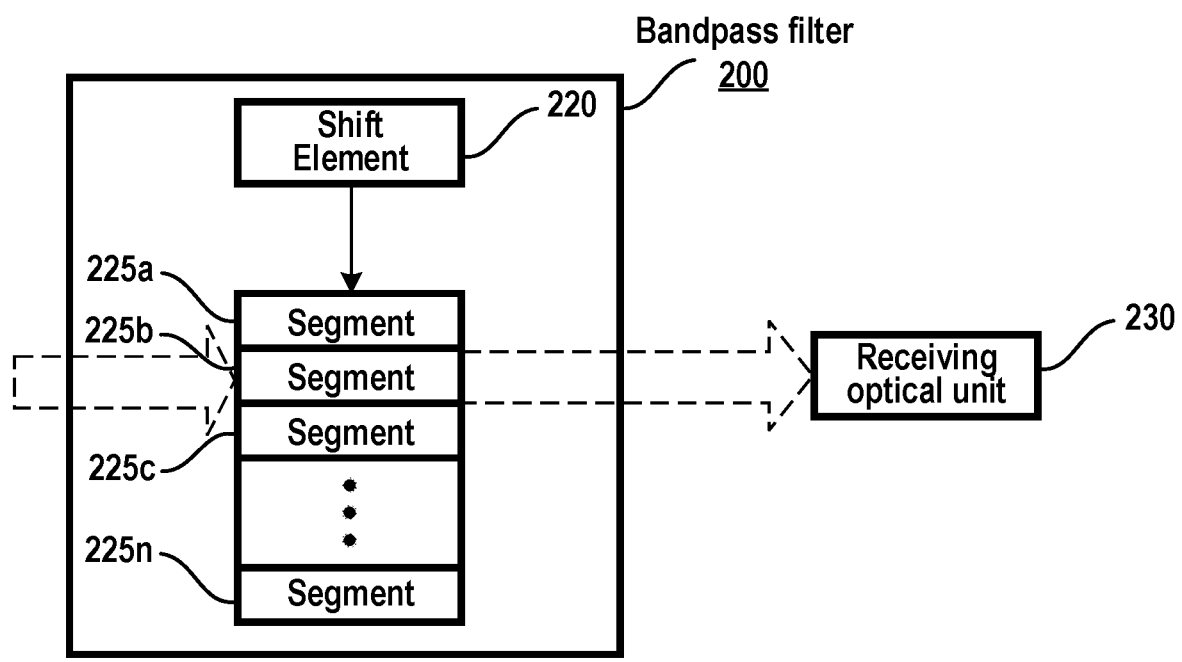
FIG. 3 shows an example embodiment in which a shift element controls which of a plurality of filter segments are placed in an optical path.

In another example embodiment of the present invention, as shown schematically in FIG. 3, the bandpass filter 200 includes bandpass filter segments 225a-225n having different layer thicknesses and thus different transmission properties. The bandpass filter 200 includes a shift element 220, for example, a type of thermal suspension, that controls which one of the bandpass filter segments 225a-225n is placed in front of, or on an optical path (schematically represented by the arrows in FIG. 3), a receiving optical unit 230 as a function of a temperature of the bandpass filter 200.

The present invention is industrially applicable in many ways, for example, in LIDAR systems which are to cover a broad temperature range. One special application example is automotive LIDAR, i.e., the use in LIDAR systems of motor vehicles.

What is claimed is:

1. A LIDAR system comprising:
 a monolithic frequency-stabilized semiconductor laser having a linear thermal wavelength shift;
 a receiver configured to receive light that passes through an optical path to the receiver; and
 a bandpass filter that:
  is configured to effectuate a thermal wavelength shift that does not deviate from the linear thermal wavelength shift of the semiconductor laser by more than 40%; and
  includes:
   a plurality of filter segments whose transmission properties differ from one another; and
   a shift element, wherein the shift element is configured to respond to change which of the plurality of filter segments is positioned in the optical path in dependence on changes in temperature.

2. The LIDAR system of claim 1, wherein the bandpass filter includes an element made entirely or partially of a material for which a dependence of a central wavelength on temperature is significantly greater than that of glass.

3. The LIDAR system of claim 1, wherein the bandpass filter includes an element made entirely or partially of a material for which a dependence of a central wavelength on temperature is at least two times greater than that of glass.

4. The LIDAR system of claim 1, wherein respective layer thicknesses of the plurality of filter segments differ from one another.

5. The LIDAR system of claim 1, wherein the thermal wavelength shift effectuated by the bandpass filter does not deviate by more than 0.01 nm/K from the linear thermal wavelength shift of the semiconductor laser.

6. The LIDAR system of claim 1, wherein the thermal wavelength shift effectuated by the bandpass filter does not deviate by more than 20% from the linear thermal wavelength shift of the semiconductor laser.

7. The LIDAR system of claim 1, wherein the thermal wavelength shift effectuated by the bandpass filter does not deviate by more than 5% from the linear thermal wavelength shift of the semiconductor laser.

8. A motor vehicle control system comprising:
 a control unit; and
 a LIDAR system that is configured to determine an obstacle distance and that includes:

a monolithic frequency-stabilized semiconductor laser having a linear thermal wavelength shift;

a receiver configured to receive light that passes through an optical path to the receiver; and a bandpass filter that:
- is configured to effectuate a thermal wavelength shift that does not deviate from the linear thermal wavelength shift of the semiconductor laser by more than 40%; and
- includes a shift element and a plurality of filter segments whose transmission properties differ from one another;

wherein:
- the shift element is configured to change which of the plurality of filter segments is positioned in the optical path in dependence on changes in temperature; and
- the control unit is configured to control obstacle avoidance of the motor vehicle based on the determined obstacle distance.

9. The LIDAR system of claim 1, wherein the bandpass filter is made at least partially of amorphous silicon.

* * * * *